(12) United States Patent
Ma (10) Patent No.: US 11,817,992 B2
(45) Date of Patent: Nov. 14, 2023

(54) SIGNAL MODULATION DEVICE AND TERMINAL

(71) Applicant: VIVO MOBILE COMMUNICATION CO., LTD., Guangdong (CN)

(72) Inventor: Shiqiang Ma, Guangdong (CN)

(73) Assignee: Vivo Mobile Communication Co., LTD., Guangdong (CN)

( * ) Notice: Subject to any disclaimer, the term of this patent is extended or adjusted under 35 U.S.C. 154(b) by 59 days.

(21) Appl. No.: 17/678,225

(22) Filed: Feb. 23, 2022

(65) Prior Publication Data

US 2022/0182277 A1    Jun. 9, 2022

Related U.S. Application Data

(63) Continuation of application No. PCT/CN2020/116155, filed on Sep. 18, 2020.

(30) Foreign Application Priority Data

Sep. 25, 2019    (CN) .......................... 201910910239.5

(51) Int. Cl.
   *H04L 27/36*    (2006.01)
(52) U.S. Cl.
   CPC ................... *H04L 27/36* (2013.01)
(58) Field of Classification Search
   CPC ...................................................... H04L 27/36
   See application file for complete search history.

(56) References Cited

U.S. PATENT DOCUMENTS

| 5,923,651 A * | 7/1999 | Struhsaker ............ H04B 7/264 370/335 |
| 2002/0075943 A1* | 6/2002 | Kurihara ................. H04J 13/00 375/E1.002 |
| 2011/0280338 A1* | 11/2011 | Mochizuki ............. H04L 27/36 375/297 |
| 2014/0307761 A1 | 10/2014 | Geile |
| 2016/0036585 A1 | 2/2016 | Akhavan-Toyserkani et al. |

(Continued)

FOREIGN PATENT DOCUMENTS

| CN | 101170383 A | 4/2008 |
| CN | 101252406 A | 8/2008 |

(Continued)

OTHER PUBLICATIONS

Research on Implementation of Higher Order Modulation Techniques in OFDM Wireless LAN, Jan. 2013, p. 1-68.

(Continued)

*Primary Examiner* — Freshteh N Aghdam
(74) *Attorney, Agent, or Firm* — IP & T GROUP LLP (57) ABSTRACT

A signal modulation device includes: a conversion module, configured to convert a baseband coded signal and output an in-phase signal sequence and a quadrature signal sequence; a coding expansion module, connected to the conversion module and configured to expand the in-phase signal sequence and the quadrature signal sequence respectively and output an in-phase signal coded sequence and a quadrature signal coded sequence; and a modulation module, connected to the coding expansion module and configured to modulate the in-phase signal coded sequence and the quadrature signal coded sequence and output a radio frequency signal.

12 Claims, 4 Drawing Sheets

(56) References Cited

U.S. PATENT DOCUMENTS

| | | | |
|---|---|---|---|
| 2018/0269983 A1 | 9/2018 | Karar et al. | |
| 2020/0052941 A1* | 2/2020 | Lang | G01S 7/0234 |
| 2020/0403839 A1* | 12/2020 | Carvalho | H03M 1/0614 |

FOREIGN PATENT DOCUMENTS

| | | | |
|---|---|---|---|
| CN | 101888694 A | 11/2010 |
| CN | 102413094 A | 4/2012 |
| CN | 103618687 A | 3/2014 |
| CN | 107395548 A | 11/2017 |
| CN | 108512796 A | 9/2018 |
| CN | 110708268 A | 1/2020 |

OTHER PUBLICATIONS

The First Office Action of Priority Application No. CN 201910910239.5 issued by the Chinese Patent Office dated Feb. 23, 2021.
International Search Report and Written Opinion of International Application No. PCT/CN2020/116155 issued by the Chinese Patent Office dated Dec. 23, 2020.

* cited by examiner

SIGNAL MODULATION DEVICE AND TERMINAL

CROSS-REFERENCE TO RELATED APPLICATIONS

The present application is a Bypass Continuation Application of PCT/CN2020/116155 filed on Sep. 18, 2020, which claims priority to Chinese Patent Application No. 201910910239.5 filed on Sep. 25, 2019, which are incorporated herein by reference in their entirety.

TECHNICAL FIELD

The present application relates to the technical field of communication application, and in particular, to a signal modulation device and a terminal.

BACKGROUND

In a wireless communication system, in order to realize the long-distance propagation of signals, it is necessary to module a low-frequency baseband signal to a radio frequency band. The amplitude, frequency and phase of a high-frequency carrier are used to realize the correspondence with the baseband signal. At present, the commonly used basic modulation modes include quadrature phase shift keying (QPSK), 16 quadrature amplitude modulation (QAM), 64QAM, 256QAM and the like.

SUMMARY

The present application provides a signal modulation device and a terminal.

According to a first aspect, embodiments of the present application provide a signal modulation device, including:
- a conversion module, configured to convert a baseband coded signal and output an in-phase signal sequence and a quadrature signal sequence;
- a coding expansion module, connected to the conversion module and configured to expand the in-phase signal sequence and the quadrature signal sequence respectively and output an in-phase signal coded sequence and a quadrature signal coded sequence; and
- a modulation module, connected to the coding expansion module and configured to modulate the in-phase signal coded sequence and the quadrature signal coded sequence and output a radio frequency signal.

According to a second aspect, embodiments of the present application further provide a terminal, including the above signal modulation device.

DETAILED DESCRIPTION OF EMBODIMENTS

The following clearly describes the technical solutions in the embodiments of the present application with reference to accompanying drawings in the embodiments of the present application. Apparently, the described embodiments are merely a part rather than all of the embodiments of the present application. All other embodiments obtained by a person of ordinary skill in the art based on the embodiments of the present application shall fall within the protection scope of the present application.

QAM is an amplitude and phase combined modulation technology; meanwhile, the amplitude and phase of a carrier are used to transmit information bit, one bit is mapped to a vector with a real part and an imaginary part, and then the real part and the imaginary part are modulated to two carriers which are orthogonal in a time domain for transmission. The more bits represented by the amplitude and phase on the carrier each time, the higher the transmission efficiency.

Although QAM high-order modulation scheme can improve frequency band efficiency, a high peak-to-average ratio is brought. Especially for long term evolution (LTE) and 5G new radio (NR), such multi-carrier high-bandwidth systems will cause higher peak-to-average ratio. However, too high peak-to-average ratio will bring greater challenges to the work of a power amplifier (PA), and will reduce the efficiency of the radio frequency PA.

Figure 1:
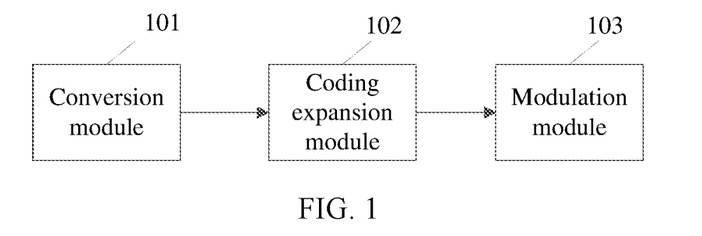
FIG. 1 is a first structural schematic diagram of a signal modulation device according to an embodiment of the present application.

As shown in FIG. 1, the embodiments of the present application provide a signal modulation device, including:
- a conversion module 101, configured to convert a baseband coded signal and output an in-phase signal sequence and a quadrature signal sequence;
- a coding expansion module 102, connected to the conversion module and configured to expand the in-phase signal sequence and the quadrature signal sequence respectively and output an in-phase signal coded sequence and a quadrature signal coded sequence;
- optionally, the coding expansion module expands each N-bits coded signal in the in-phase signal sequence and the quadrature signal sequence respectively and outputs an in-phase signal coded sequence and a quadrature signal coded sequence, and N is a positive integer; and
- a modulation module 103, connected to the coding expansion module and configured to modulate the in-phase signal coded sequence and the quadrature signal coded sequence and output a radio frequency signal.

In the embodiments of the present application, the conversion module divides a baseband signal BaseBand(n) into an in-phase signal sequence (n) and a quadrature signal sequence Q(n) through serial-parallel conversion; the coding expansion module respectively expands I(n) and Q(n) output by the conversion module and outputs an in-phase signal coded sequence and a quadrature signal coded sequence; and finally, the modulation module performs carrier modulation on the in-phase signal coded sequence and the quadrature signal coded sequence and outputs a radio frequency signal.

According to the signal modulation device provided by the embodiments of present application, the in-phase signal sequence and the quadrature signal sequence are subjected to coding expansion, and carrier adjustment is performed on the basis of the expanded in-phase signal sequence and quadrature signal sequence, so that the peak-to-average ratio of the QAM modulation mode and the workload of the post power amplifier are reduced, and the efficiency of the power amplifier is improved. In addition, the device provided by the embodiments of the present application does not need to expand baseband coded information, will not introduce redundant information to the system and avoid damage to a frame structure, and has a simple structure.

Figure 2:
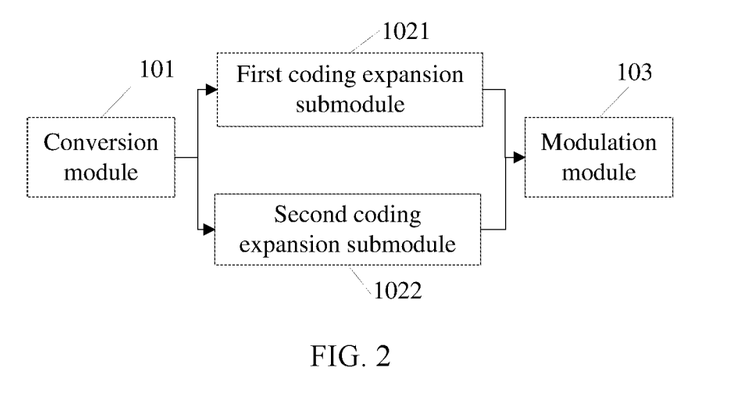
FIG. 2 is a second structural schematic diagram of a signal modulation device according to an embodiment of the present application.

Optionally, as shown in FIG. 2, the coding expansion module 102 includes: a first coding expansion submodule 1021 and a second coding expansion submodule 1022 which are connected to the conversion module 101 respectively;

the first coding expansion submodule 1021 expands the in-phase signal sequence and outputs an in-phase signal coded sequence; and the second coding expansion submodule 1022 expands the quadrature signal sequence and outputs a quadrature signal coded sequence.

Optionally, the first coding expansion submodule 1021 expands each N-bits coded signal in the in-phase signal sequence and outputs a plurality of in-phase signal coded sequence; and the second coding expansion submodule 1022 expands each N-bits coded signal in the quadrature signal sequence and outputs a plurality of quadrature signal coded sequences, wherein N is a positive integer, and the value of N is determined according to a modulation mode. N may be $$\frac{\log_2 L}{2},$$

wherein L represents the number of sample points corresponding to the modulation mode, and the modulation mode is a modulation mode adopted by the coding expansion module. For example, for 16QAM, L is 16 and N is 2, that is, the first coding expansion submodule expands each 2-bit coded signal in the in-phase signal sequence and outputs a plurality of in-phase signal coded sequences, and the second coding expansion submodule expands each 2-bit coded signal in the quadrature signal sequence and outputs a plurality of quadrature signal coded sequences. For 64QAM, N is 3; and for 256QAM, N is 4.

Optionally, the first coding expansion submodule expands each N-bits coded signal in the in-phase signal sequence to M bits to obtain a plurality of in-phase signal coded sequences with a length of M bits; and the second coding expansion submodule expands each N-bits coded signal in the quadrature signal sequence to M bits to obtain a plurality of quadrature signal coded sequences with a length of M bits, where M is greater than N.

The value of M is inversely proportional to a peak-to-average ratio corresponding to the baseband coded signal. That is, in the embodiments of the present application, a user may set the value of M according to the peak-to-average ratio. In a case that a lower peak-to-average ratio is desired, the value of M may be set to be larger.

Figure 3:
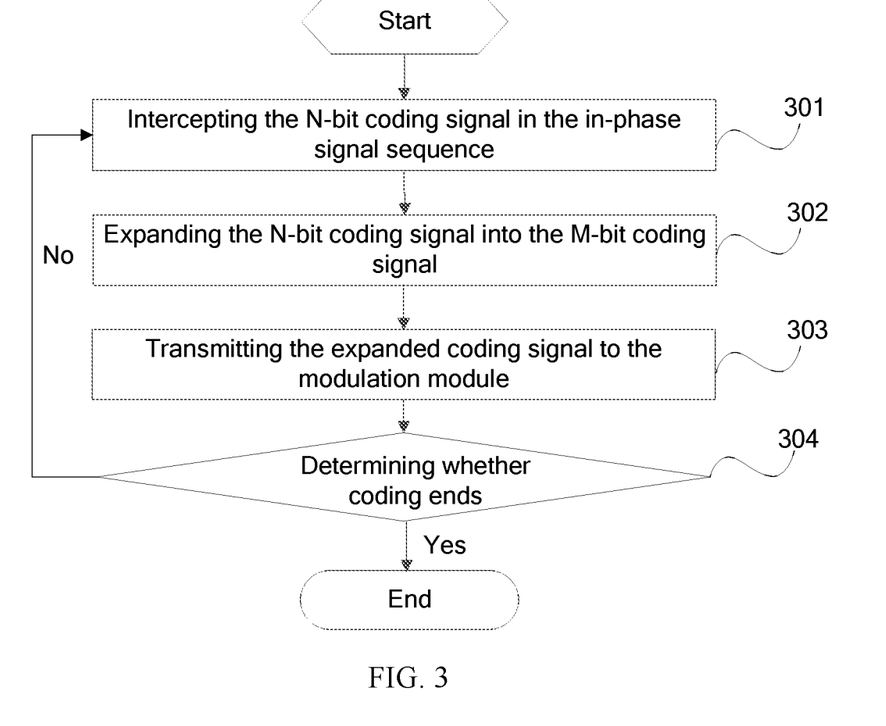
FIG. 3 is a workflow schematic diagram of a first coding expansion submodule according to an embodiment of the present application.

The flow of the first coding expansion submodule is as shown in FIG. 3, including:

step 301: intercepting the N-bits coded signal in the in-phase signal sequence.

Step 302: expanding the N-bits coded signal to the M-bits coded signal.

Step 303: transmitting the expanded coded signal to the modulation module.

Optionally, the expanded coded signal is transmitted to a first digital-to-analogue conversion unit.

Step 304: determining whether coding ends.

Optionally, it is determined whether there is an unexpanded coded signal in the in-phase signal sequence. In a case that there is the unexpanded coded signal, skip to step 301, otherwise, end.

In some embodiments of the present application, I(n)=(I$_1$, I$_2$, . . . , I$_n$), for 16QAM, the first coding expansion submodule expands each 2-bit coded signal in the in-phase signal sequence to 5 bits, for example, when the current 2-bit coded signal [I(N), I(N+1)] is expanded as [I(N), I(N+1), 1, 1, 1] and is transmitted to the modulation module, and then the subsequent 2-bit coded signal is expanded until ending.

Figure 4:
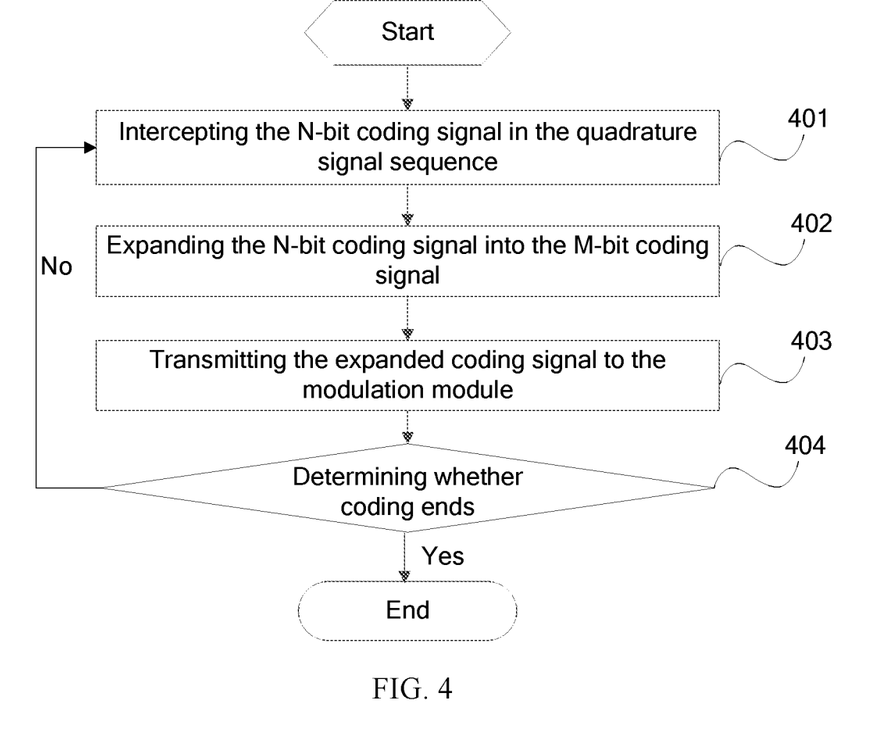
FIG. 4 is a workflow schematic diagram of a second coding expansion submodule according to an embodiment of the present application.

The flow of the second coding expansion submodule is as shown in FIG. 4, including:

step 401: intercepting the N-bits coded signal in the quadrature signal sequence.

Step 402: expanding the N-bits coded signal to the M-bits coded signal.

Step 403: transmitting the expanded coded signal to the modulation module.

Optionally, the expanded coded signal is transmitted to a second digital-to-analogue conversion unit.

Step 404: determining whether coding ends.

Optionally, it is determined whether there is an unexpanded coded signal in the quadrature signal sequence. In a case that there is the unexpanded coded signal, skip to step 401, otherwise, end.

In some embodiments of the present application, Q(n)= (Q$_1$, Q$_2$, . . . , Q$_n$), for 16QAM, the first coding expansion submodule expands each 2-bit coded signal in the quadrature signal sequence to 5 bits, for example, when the current 2-bit coded signal [Q(N), Q(N+1)] is expanded as [Q(N), Q(N+1), 1, 1, 1] and is transmitted to the modulation module, and then the subsequent 2-bit coded signal is expanded until ending.

Figure 5:
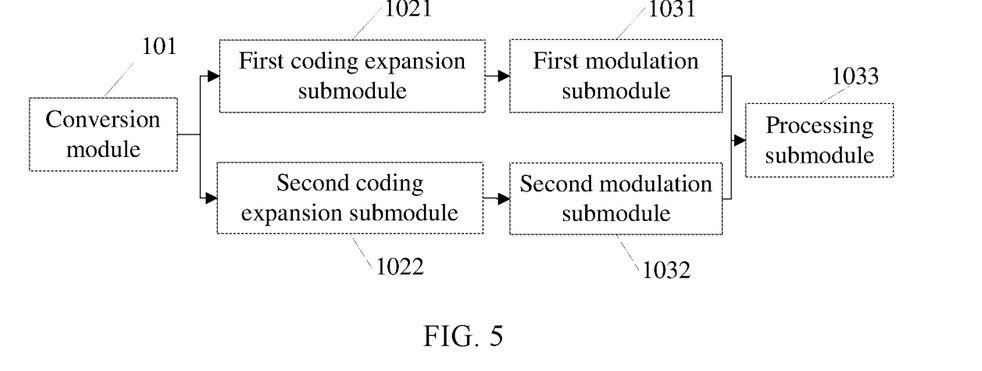
FIG. 5 is a third structural schematic diagram of a signal modulation device according to an embodiment of the present application.

Optionally, as shown in FIG. 5, the modulation module 103 includes:

a first modulation submodule 1031, connected to the first coding expansion submodule and configured to perform digital-to-analogue conversion, filtering and frequency mixing on the in-phase signal coded sequence to obtain a first sequence;

a second modulation submodule 1032, connected to the second coding expansion submodule and configured to perform digital-to-analogue conversion, filtering and frequency mixing on the quadrature signal coded sequence to obtain a second sequence; and a processing submodule 1033, connected to the first coding expansion submodule and the second coding expansion submodule respectively and configured to superpose the first sequence and the second sequence and output a radio frequency signal.

Herein, the first sequence and the second sequence are superposed by the processing submodule and then are output to a power amplifier.

Figure 6:
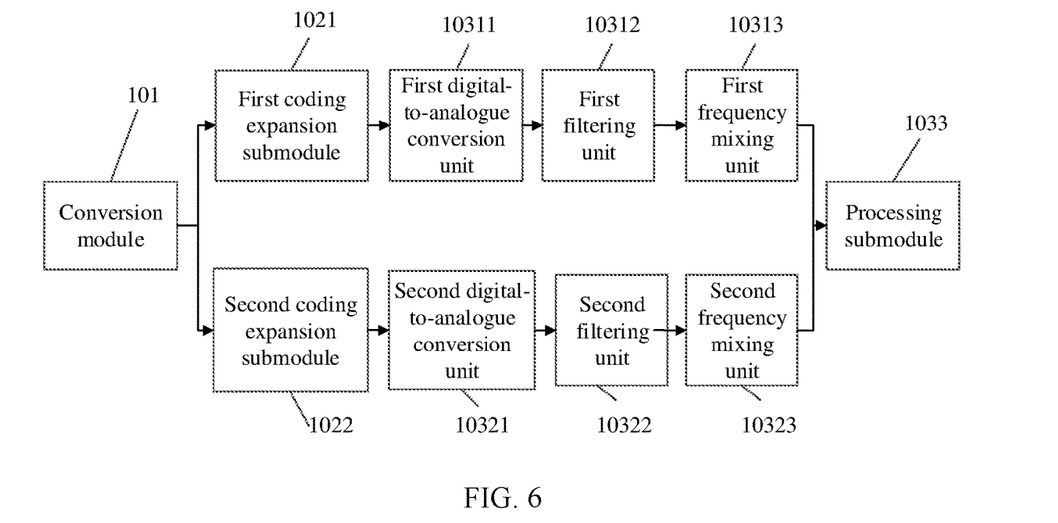
FIG. 6 is a fourth structural schematic diagram of a signal modulation device according to an embodiment of the present application.

As shown in FIG. 6, the first modulation submodule 1031 includes:
- a first digital-to-analogue conversion unit 10311, connected to the first coding expansion submodule 1021;
- a first filtering unit 10312, connected to the first digital-to-analogue conversion unit 10311; and
- a first frequency mixing unit 10313, connected to the first filtering unit 10312 and the processing submodule 1033 respectively.

In the embodiments of the present application, the first digital-to-analogue conversion unit performs analogue-to-digital conversion on the in-phase signal coded sequence output by the first coding expansion submodule 1021 to obtain a corresponding amplitude signal, the amplitude signal is filtered by the first filtering unit and output to the first frequency mixing unit, and the first frequency mixing unit realizes up conversion of a transmitting signal, so that the signal moves from a baseband to a radio frequency band. The first filtering unit may be a baseband shaping filter, and the first frequency mixing unit is a frequency mixer.

As shown in FIG. 6, the second modulation submodule 1032 includes:
- a second digital-to-analogue conversion unit 10321, connected to the second coding expansion submodule;
- a second filtering unit 10322, connected to the second digital-to-analogue conversion unit; and
- a second frequency mixing unit 10323, connected to the second filtering unit and the processing submodule respectively.

In the embodiments of the present application, the second digital-to-analogue conversion unit performs analogue-to-digital conversion on the quadrature signal coded sequence output by the second coding expansion submodule to obtain a corresponding amplitude signal, the amplitude signal is filtered by the second filtering unit and output to the second frequency mixing unit, and the second frequency mixing unit realizes up conversion of a transmitting signal, so that the signal moves from a baseband to a radio frequency band. The second filtering unit may be a baseband shaping filter, and the second mixing unit is a frequency mixer.

The signal modulation device provided by the embodiments of the present application effectively improves the peak-to-average ratio by adding the coding expansion module, which will be described below with reference to some embodiments.

Figure 7:
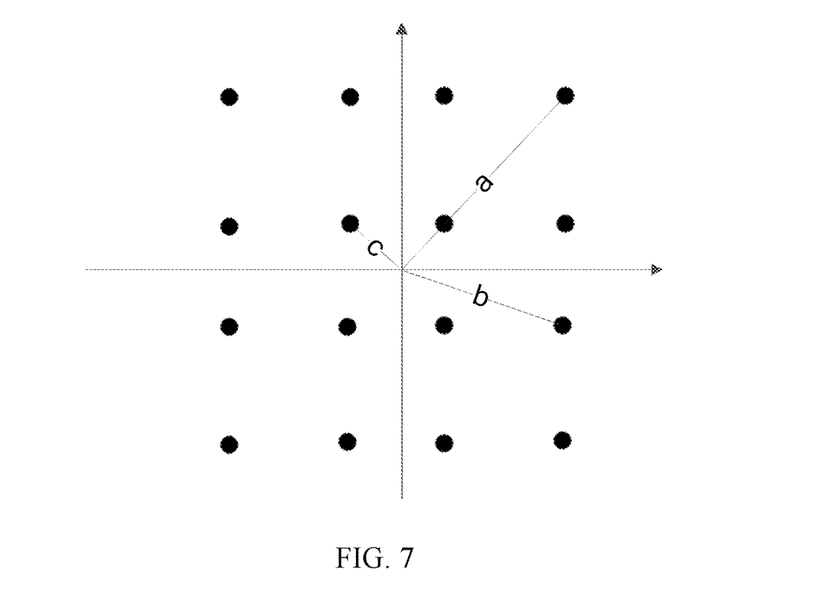
FIG. 7 is a constellation schematic diagram of 16QAM in the prior art.

As shown in FIG. 7, for 16QAM, an existing signal modulation device is used to perform carrier modulation. In a case that the feature of a complementary cumulative distribution function (CCDF) is not considered, a normalized power peak-to-average ratio is calculated with the equal-probability occurrence of each coordinate point, wherein a length from each coordinate point to the original point includes a, b and c.

Normalized power $a^2=3^2+3^2=18$, the occurrence probability is ¼;
normalized power $b^2=1^2+3^2=10$, the occurrence probability is ½;
normalized power $c^2=1^2+1^2=2$, the occurrence probability is ¼;
average power $p_{avg}=18*¼+10*½+2*¼=10$;
the peak-to-average ratio PAPR=10 log 18/10=2.55 dB.

Figure 8:
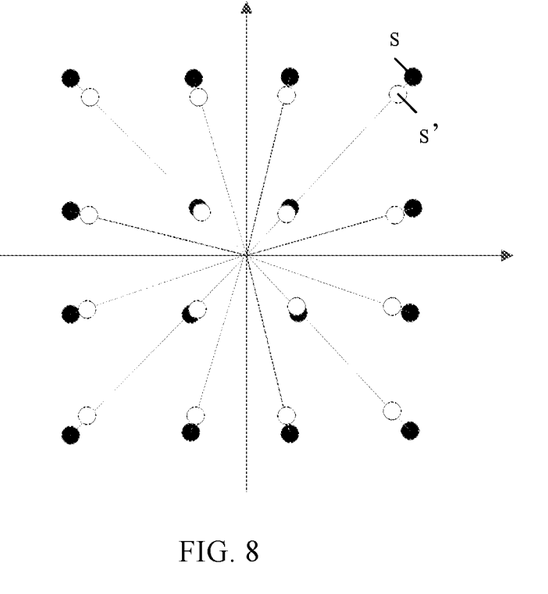
FIG. 8 is a comparison schematic diagram of constellation coordinates before and after shrinkage.
Figure 9:
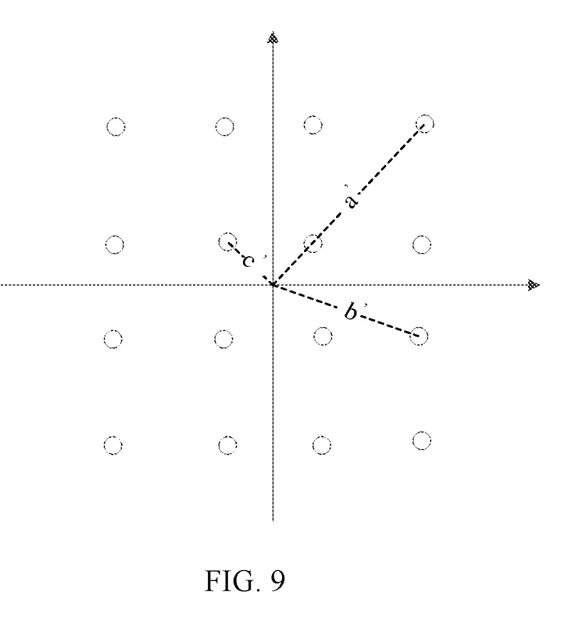
FIG. 9 is a constellation schematic diagram after shrinkage according to an embodiment of the present application.

As shown in FIG. 8, taking 16QAM single-carrier as an example, each 2-bit data in the in-phase signal sequence and the quadrature signal sequence is expanded to 5 bits, for example, [0, 0] is expanded as [0, 0, 1, 1, 1], [0, 1] is expanded as [0, 1, 1, 1,], [1, 0] is expanded as [1, 0, 1, 1, 1], [1, 1] is expanded as [1, 1, 1, 1, 1], then the constellation diagram will be shrunk. In FIG. 8, s represents an original coordinate point, and s' represents a shrunk coordinate point. At this time, assuming that a first distance between the first coordinate point in the shrunk coordinate point and the original point is 1, a ratio of a second distance between the second coordinate point in the shrunk coordinate point and the original point to the first distance is $$\frac{[1, 1, 1, 1]b}{[0, 1, 1, 1]b} = \frac{15}{7} = \frac{2.14}{1},$$

wherein the first coordinate point represents the coordinate point in the shrunk coordinate point closest to the original point, the second coordinate point represents the coordinate point in the shrunk coordinate point farthest away from the original point, [1, 1, 1, 1] is mapped as the second coordinate point, [0, 1, 1, 1] is mapped as the first coordinate point, the first bit is a sign bit without amplitude calculation, then at this time, the amplitudes corresponding to normalization in the constellation diagram are 1 and 2.14. The shrunk constellation diagram is as shown in FIG. 9. In FIG. 9, a length from each coordinate point to the original point includes a', b' and c'.

Normalized power $a'^2=2.14^2+2.14^2=9.1592$, the occurrence probability is ¼;
normalized power $b'^2=1^2+2.14^2=5.5796$, the occurrence probability is ½;
normalized power $c'^2=1^2+1^2=2$, the occurrence probability is ¼;
average power $p_{avg}=9.152*¼+5.5796*½+2*¼=5.5796$;
the peak-to-average ratio $$PAPR = 10\log\frac{9.1592}{5.5796} = 2.15 \text{ dB};$$

it may be seen that for 16QAM, the device provided by the embodiments of the present application can reduce the peak-to-average ratio by 15.7%.

According to the signal modulation device provided by the embodiments of present application, the in-phase signal sequence and the quadrature signal sequence are subjected to coding expansion, and carrier adjustment is performed on the basis of the expanded in-phase signal sequence and quadrature signal sequence, so that the peak-to-average ratio of the QAM modulation mode and the workload of the post power amplifier are reduced, and the efficiency of the power amplifier is improved. In addition, the device provided by the embodiments of the present application does not need to expand baseband coded information, will not introduce redundant information to the system and avoid damage to a frame structure, and has a simple structure.

The embodiments of the present application further provide a terminal, including the above signal modulation device. The terminal can implement all implementation manners in the above signal modulation device embodiments, and the same technical effect can be achieved, which will not be elaborated herein.

Each embodiment in the specification is described in a progressive manner, each embodiment focuses on the difference from other embodiments, and the same and similar parts between the embodiments may refer to each other.

Although embodiments of the present application have been described, those skilled in the art may make additional changes and modifications to these embodiments once they learn the basic inventive concept. Therefore, the following claims are intended to be construed as to include the embodiments and all changes and modifications falling within the scope of the present application.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without more restrictions, the elements defined by the sentence "including a . . . " do not exclude the existence of other identical elements in the process, method, article, or terminal device including the elements.

The above-mentioned contents are merely embodiments of the present application, and are not used to limit the present application, and wherever within the spirit and principle of the present application, any modifications, equivalent replacements, improvements, and the like shall be all included within the protection scope of the present application.

What is claimed is:

1. A signal modulation device, comprising:
   a conversion module, configured to convert a baseband coded signal and output an in-phase signal sequence and a quadrature signal sequence;
   a coding expansion module, connected to the conversion module and configured to expand the in-phase signal sequence and the quadrature signal sequence respectively and output an in-phase signal coded sequence and a quadrature signal coded sequence; and
   a modulation module, connected to the coding expansion module and configured to modulate the in-phase signal coded sequence and the quadrature signal coded sequence and output a radio frequency signal;
   wherein the coding expansion module comprises: a first coding expansion submodule and a second coding expansion submodule which are connected to the conversion module respectively; wherein
   the first coding expansion submodule expands the in-phase signal sequence and output the in-phase signal coded sequence; and
   the second coding expansion submodule expands the quadrature signal sequence and output the quadrature signal coded sequence;
   wherein the first coding expansion submodule expands each N-bits coded signal in the in-phase signal sequence and output a plurality of in-phase signal coded sequences; and
   the second coding expansion submodule expands each N-bits coded signal in the quadrature signal sequence and outputs a plurality of quadrature signal coded sequences, N being a positive integer;
   wherein the value of N is determined by following formula:

$$N = \frac{\log_2 L}{2};$$

wherein
   L represents the number of sample points corresponding to a modulation mode, and the modulation mode is a modulation mode adopted by the coding expansion module.

2. The signal modulation device according to claim 1, wherein the first coding expansion submodule expands each N-bits coded signal in the in-phase signal sequence to M bits to obtain a plurality of in-phase signal coded sequences with a length of M bits; and
   the second coding expansion submodule expands each N-bits coded signal in the quadrature signal sequence to M bits to obtain a plurality of quadrature signal coded sequences with a length of M bits, M being greater than N.

3. The signal modulation device according to claim 2, wherein the value of M is inversely proportional to a peak-to-average ratio corresponding to the baseband coded signal.

4. The signal modulation device according to claim 1, wherein the modulation module comprises:
   a first modulation submodule, connected to the first coding expansion submodule and configured to perform digital-to-analogue conversion, filtering and frequency mixing on the in-phase signal coded sequence to obtain a first sequence;
   a second modulation submodule, connected to the second coding expansion submodule and configured to perform digital-to-analogue conversion, filtering and frequency mixing on the quadrature signal coded sequence to obtain a second sequence; and
   a processing submodule, connected to the first coding expansion submodule and the second coding expansion submodule respectively and configured to superpose the first sequence and the second sequence and output the radio frequency signal.

5. The signal modulation device according to claim 4, wherein the first modulation submodule comprises:
   a first digital-to-analogue conversion unit, connected to the first coding expansion submodule;
   a first filtering unit, connected to the first digital-to-analogue conversion unit; and
   a first frequency mixing unit, connected to the first filtering unit and the processing submodule respectively.

6. The signal modulation device according to claim 4, wherein the second modulation submodule comprises:
   a second digital-to-analogue conversion unit, connected to the second coding expansion submodule;
   a second filtering unit, connected to the second digital-to-analogue conversion unit; and
   a second frequency mixing unit, connected to the second filtering unit and the processing submodule respectively.

7. A terminal, comprising a signal modulation device, wherein the signal modulation device comprises:
   a conversion module, configured to convert a baseband coded signal and output an in-phase signal sequence and a quadrature signal sequence;
   a coding expansion module, connected to the conversion module and configured to expand the in-phase signal sequence and the quadrature signal sequence respectively and output an in-phase signal coded sequence and a quadrature signal coded sequence; and
   a modulation module, connected to the coding expansion module and configured to modulate the in-phase signal coded sequence and the quadrature signal coded sequence and output a radio frequency signal;

wherein the coding expansion module comprises: a first coding expansion submodule and a second coding expansion submodule which are connected to the conversion module respectively; wherein the first coding expansion submodule expands the in-phase signal sequence and output the in-phase signal coded sequence; and the second coding expansion submodule expands the quadrature signal sequence and output the quadrature signal coded sequence;

wherein the first coding expansion submodule expands each N-bits coded signal in the in-phase signal sequence and output a plurality of in-phase signal coded sequences; and the second coding expansion submodule expands each N-bits coded signal in the quadrature signal sequence and outputs a plurality of quadrature signal coded sequences, N being a positive integer;

wherein the value of N is determined by following formula:

$$N = \frac{\log_2 L}{2};$$

wherein

L represents the number of sample points corresponding to a modulation mode, and the modulation mode is a modulation mode adopted by the coding expansion module.

8. The terminal according to claim 7, wherein the first coding expansion submodule expands each N-bits coded signal in the in-phase signal sequence to M bits to obtain a plurality of in-phase signal coded sequences with a length of M bits; and the second coding expansion submodule expands each N-bits coded signal in the quadrature signal sequence to M bits to obtain a plurality of quadrature signal coded sequences with a length of M bits, M being greater than N.

9. The terminal according to claim 8, wherein the value of M is inversely proportional to a peak-to-average ratio corresponding to the baseband coded signal.

10. The terminal according to claim 7, wherein the modulation module comprises:

a first modulation submodule, connected to the first coding expansion submodule and configured to perform digital-to-analogue conversion, filtering and frequency mixing on the in-phase signal coded sequence to obtain a first sequence;

a second modulation submodule, connected to the second coding expansion submodule and configured to perform digital-to-analogue conversion, filtering and frequency mixing on the quadrature signal coded sequence to obtain a second sequence; and a processing submodule, connected to the first coding expansion submodule and the second coding expansion submodule respectively and configured to superpose the first sequence and the second sequence and output the radio frequency signal.

11. The terminal according to claim 10, wherein the first modulation submodule comprises:

a first digital-to-analogue conversion unit, connected to the first coding expansion submodule;

a first filtering unit, connected to the first digital-to-analogue conversion unit; and a first frequency mixing unit, connected to the first filtering unit and the processing submodule respectively.

12. The terminal according to claim 10, wherein the second modulation submodule comprises:

a second digital-to-analogue conversion unit, connected to the second coding expansion submodule;

a second filtering unit, connected to the second digital-to-analogue conversion unit; and a second frequency mixing unit, connected to the second filtering unit and the processing submodule respectively.

* * * * *